May 2, 1933.  F. BUEHLER ET AL  1,906,532
TREE MOVING APPARATUS
Filed March 9, 1931  3 Sheets-Sheet 1
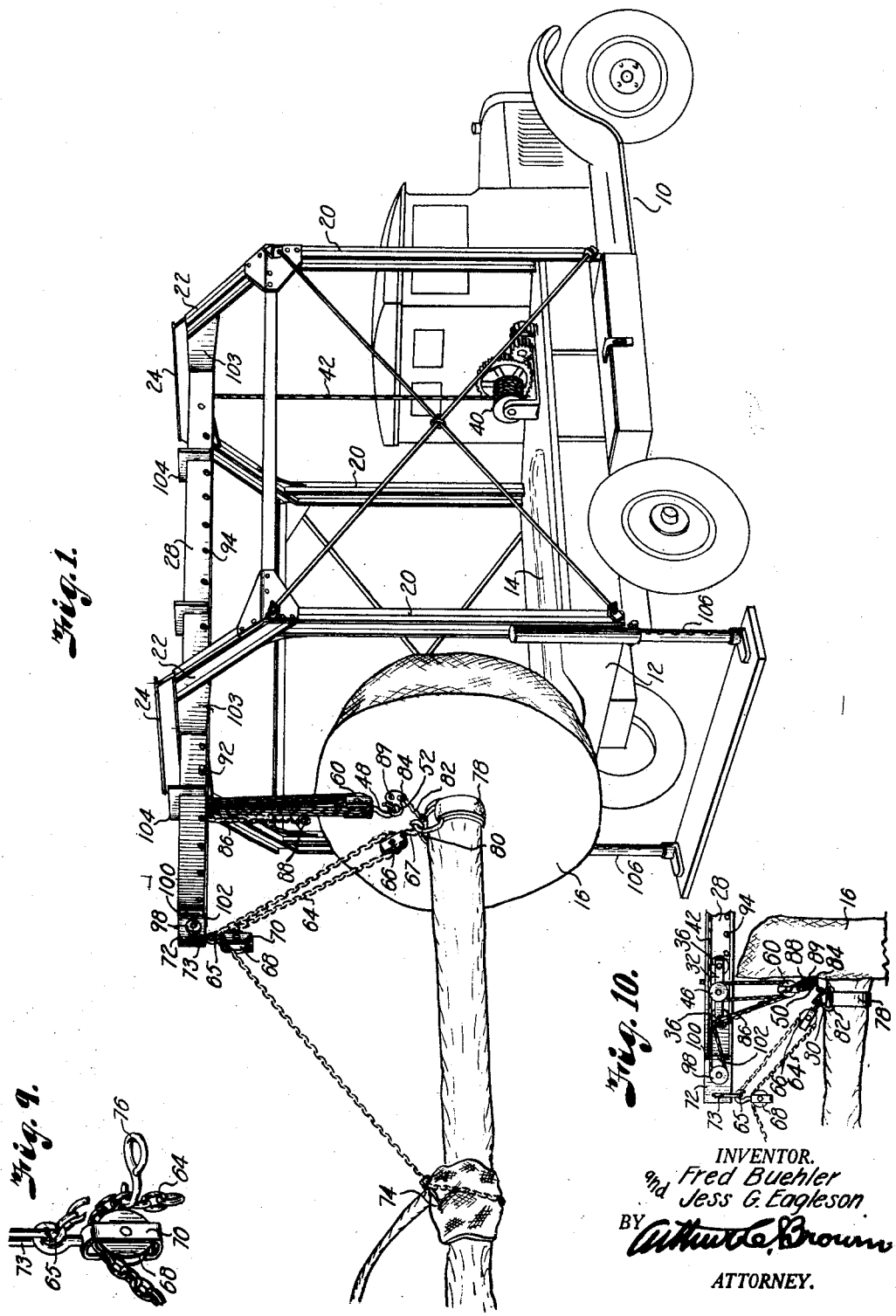
INVENTOR.
Fred Buehler
and Jess G. Eagleson
BY
Arthur L. Brown
ATTORNEY.

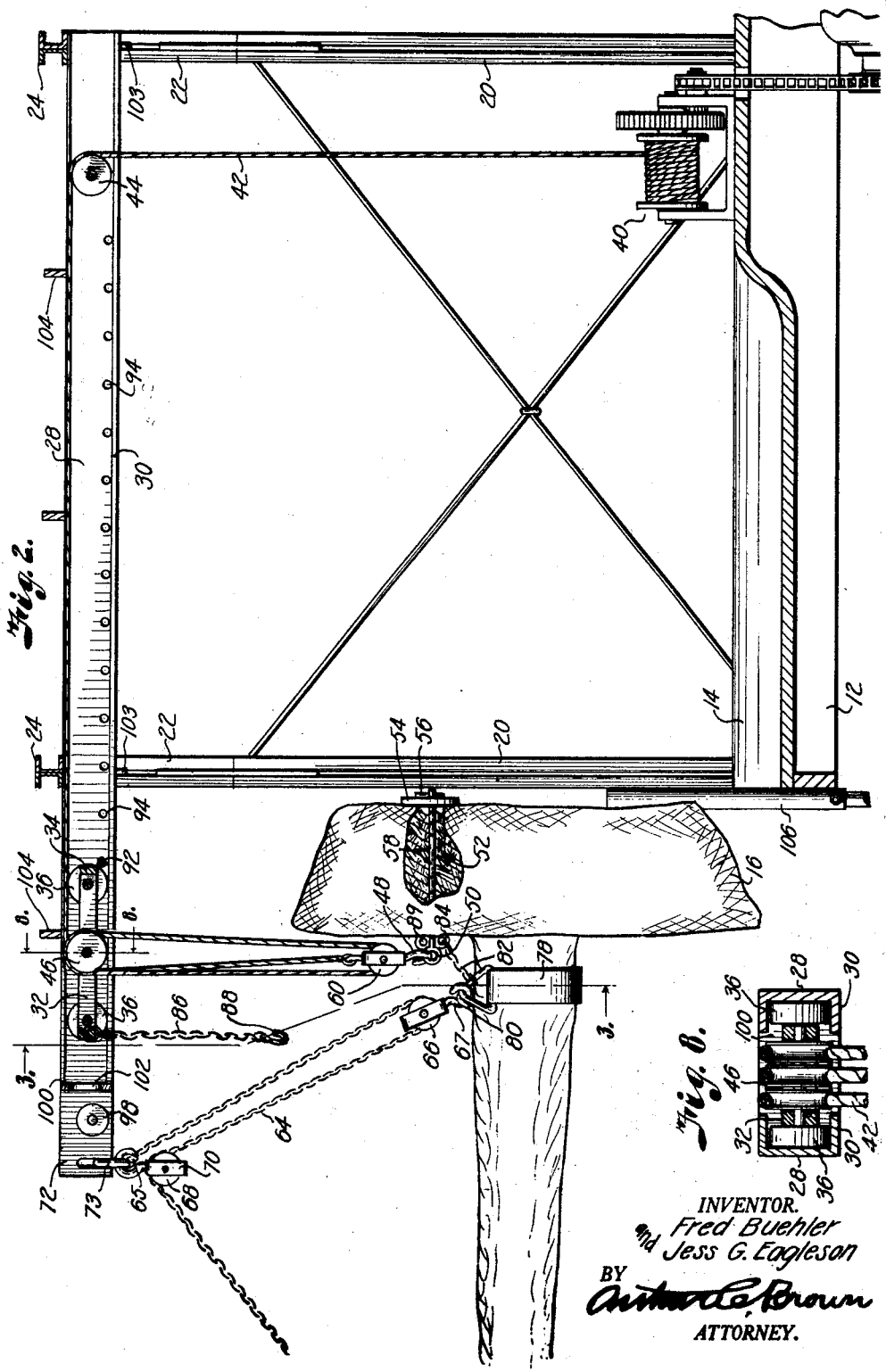

May 2, 1933.  F. BUEHLER ET AL  1,906,532
TREE MOVING APPARATUS
Filed March 9, 1931  3 Sheets-Sheet 3
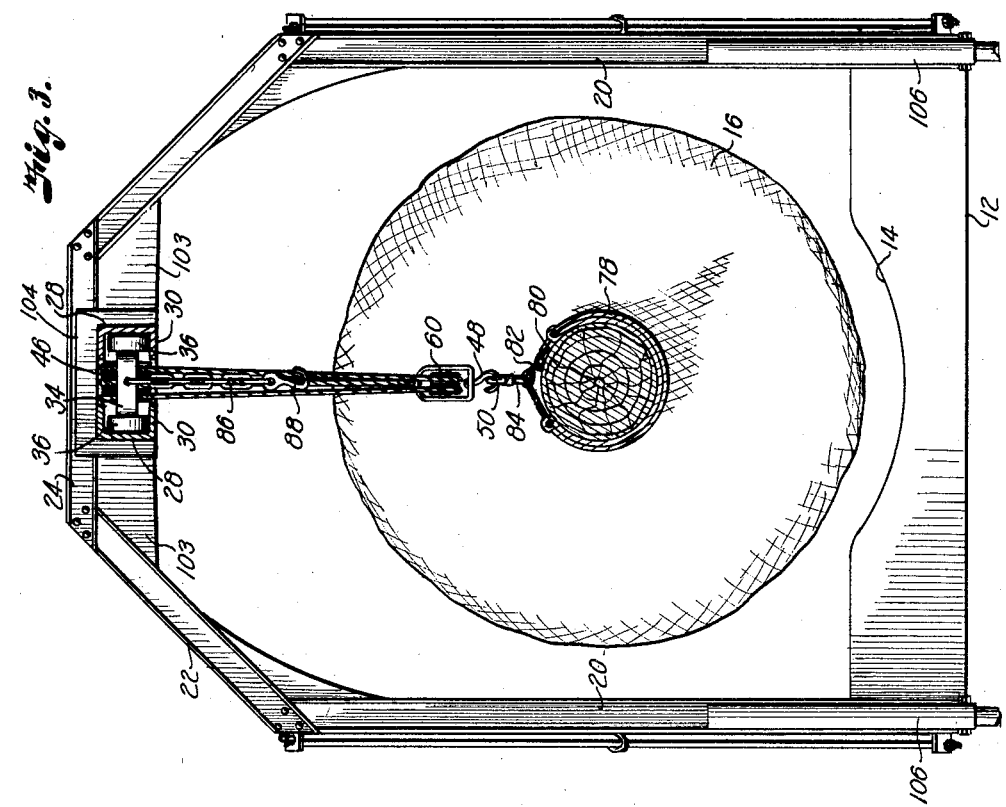
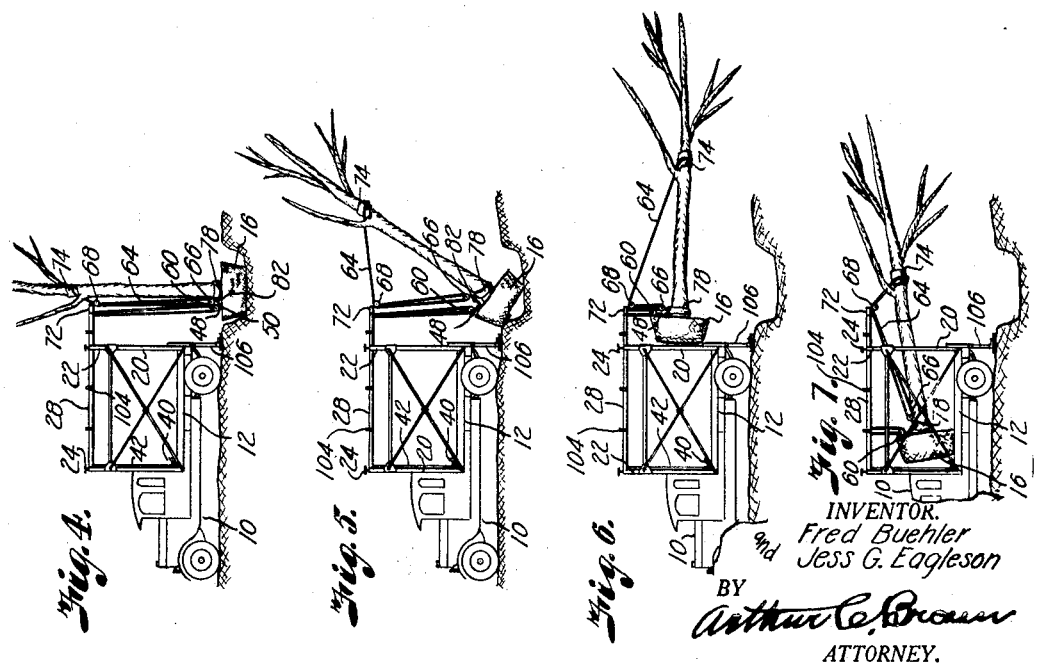
INVENTOR.
Fred Buehler
Jess G. Eagleson
BY
Arthur C. Brown
ATTORNEY.

Patented May 2, 1933　　　　　　　　　　　　　　　　　　　　　　1,906,532

UNITED STATES PATENT OFFICE

FRED BUEHLER AND JESS G. EAGLESON, OF KANSAS CITY, MISSOURI, ASSIGNORS TO WILLIAMS AND HARVEY NURSERIES CO., OF KANSAS CITY, MISSOURI, A CORPORATION OF MISSOURI

TREE MOVING APPARATUS

Application filed March 9, 1931. Serial No. 521,220.

This invention relates to apparatus for hoisting, moving and placing trees, and particularly to apparatus of this character for transplanting relatively large trees that should have heavy balls of roots and earth.

The principal objects of this invention are to effect loading and unloading of trees with minimum amounts of effort and damage to the tree and ball of earth and roots, and to enable tree movers to provide for a suitably large ball of earth on a large tree.

Other objects of the invention will be apparent in the course of the following description of one form of structure embodying the invention and illustrated in the accompanying drawings, wherein:

Fig. 1 is a perspective view of a truck equipped with this invention and a tree shown fragmentarily supported in position to be moved forwardly onto the truck bed.

Fig. 2 is a longitudinal central section through the truck illustrating particularly a carriage and balancing device for supporting the tree.

Fig. 3 is a cross section on the line 3—3, Fig. 2.

Fig. 4 is a reduced side elevation of the apparatus shown in a position for hoisting or placing a tree.

Fig. 5 is a similar view illustrating the effect of means controlling the tilting of the tree when suspended by the hoisting cable.

Fig. 6 is a similar view illustrating the tree tilted into horizontal position.

Fig. 7 is a similar view illustrating the tree moved forwardly and deposited on the floor of the truck.

Fig. 8 is an enlarge detail section on the line 8—8, Fig. 2, a hoisting cable being shown fragmentarily.

Fig. 9 is a detail perspective fragmentary view of the pulley, hooks and chain operating on the pulley for balancing the ball and top of the tree.

Fig. 10 is a fragmentary detail view illustrating the cable as being applied to move the trolley along the track in loading or unloading a tree.

Referring in detail to the drawings:

10 designates a motor truck having a bed 12 provided with an arcuate seat or channel 14 to receive the ball 16 of a tree adapted to be hoisted and deposited on the truck, and removed from the truck to a new location, by apparatus presently described.

Fixed to the bed are posts 20 connected by suitable side bars to form a substantial rectangular frame. Arches 22 including I-beam-like cross members 24 are mounted on the posts for supporting a longitudinal overhead crane beam consisting of laterally spaced parallel channels 28. The upper flanges of the channels are fixed to the beams 24, and the lower edge flanges 30 form a track. A carriage or trolley having a frame-like body comprising longitudinal bars 32 and cross bars 34, is provided with wheels 36 running on the track.

Mounted on the front end of the bed is a winch 40 for operating a cable 42 running over a pulley 44 mounted on the front ends of the channels and over a double sheave block consisting of pulleys 46 on the carriage. Portions of the cable thus operate between the channels while the trolley is moving on the track as later described.

The outer end of the cable is provided with a hook 48 to engage an eye 50 in the front end of a rod 52 adapted to be mounted in the ball of the tree. A plate 54 mounted on the end of the rod that projects from the bottom face of the ball is latched to the ball by a pin 56 insertable in one of a plurality of apertures 58 in the rod. The rod thus provides means for attaching the cable to the ball at one side of the tree trunk, without risk of tearing the mass of cut roots and the soil forming the ball.

The cable may further be provided with a pulley 60 or double sheave block, to which the hook 48 is connected for increasing the power ratio in operating the cable by the winch.

A flexible member such as a chain 64 having one end 65 connected to the channels and the other end connected to the tree, runs on a pulley 66 having a hook 67 connected with the tree adjacent the ball, and on a pulley 68 mounted in a yoke 70 suspended from the channels for tilting the tree. A plate or tongue 72 extends longitudinally from the channels as later described, and a loop 73 is mounted thereon to receive the upper end of the chain 64. The pulley 68 is also suspended from the loop 73. The outer end of the cable is adapted for connection to the trunk of the tree at a point substantially distant from the ball as shown at 74. A hook or latch 76 may be inserted in a link of the chain 64 to engage the pulley 68 and stop movement of the chain, as shown in Fig. 9.

A strap or saddle 78, preferably flexible, is mounted on the trunk adjacent the ball and provided with hooks 80 to receive the hook 67 on the balancing chain. A chain 82 having one end connected to the strap is fixed on a bracket-like ear 84 formed on a flange or shoulder of the rod which overlies the upper face of the ball to prevent the strap from slipping upwardly on the trunk. Strain due to operation of the leveling chain when the tree is hoisted is taken up by the rod 52 and plate 54.

Depending from the front end of the carriage is a short chain 86 having a hook 88 engageable with the structure attached to the ball, for example with an ear 89 on the rod flange, for supporting the tree after the same has been hoisted.

In order to latch the trolley against movement due to winding of the cable by the winch or other influence, a pin 92 may be inserted in one of a plurality of pairs of openings 94 in the channels. Fig. 2 shows the trolley latched in an extreme rearwardly position while the cable is lifting the tree. Removal of the pin from the position shown in Fig. 2 and winding the cable will result in movement of the trolley forwardly on the track for depositing the tree on the bed of the truck, whatever the longitudinal inclination of the bed may be.

It is apparent that the trolley will tend to move by gravity if one end of the truck is elevated, but may be restrained by the cable and winch from rolling rearwardly on the track.

A pulley 98 shown in Fig. 10 is mounted on the tongue 72 at the rear end of the channels to receive one loop of the cable for enabling the winch to pull the trolley on the track in moving the tree into or out of the truck.

The tongue 72 consists of a flange projecting at right angles from an intermediate position on a plate 100 overlying and attached to the end edges of both channels to locate the tongue adjacent the median line of the pair of channels and align the pulley with one portion of the sheave block 46. A slot 102 is formed in the mounting plate and a cable loop may be passed through the slot and mounted on the aligned pulley 98 to enable the winch to pull the tree rearwardly on the truck, or when the tree is being let into the truck the cable may be used to control its movement, particularly when the forward end of the truck is positioned down-hill.

Truss-like plates 103 fixed to the arches have vertical inner edges fixed to the channel webs to additionally support the channels and prevent spreading thereof, and inverted U-shaped clip-like reinforcing members 104 are distributed along the channels for retaining the channels in parallel relation.

A jack-like propping device 106 is mounted on the rear end of the truck to support the same while the tree is being loaded or unloaded.

In using the apparatus, the truck is backed up to a tree standing vertically in an excavation. The roots of the tree are cut to form the ball, and the supporting rod is mounted in the ball, the crane on the truck and suitable straps being employed for lifting the tree to permit installation of the rod and the earth-retaining bottom face plate. The head on the rod is adjusted with relation to the ball to locate the center of gravity of the tree so that when it is elevated from the excavation the weight of the tree will tend to substantially balance the ball.

The trolley is latched in a rearward location on the track by the pin 92. The cable hook is connected to the rod and the winch operated to lift the tree, the chain 64 operating automatically to gradually effect tilting of the tree into horizontal position by the time the ball is elevated above the truck bed level. The short chain may then be inserted in the eye of the rod ear 89, the pin 92 removed, and the winch operated to move the tree onto the truck. Tilting of the tree may be controlled by use of the latching member 76.

The tree may be lowered to the truck bed by releasing the short chain.

The tree may be unloaded and set up in a new location, by reversing operations, a loop of the cable being passed through the slot 102 and over the pulley 98 for moving the tree rearwardly.

The chain 64 also operates automatically to right the tree when it is being unloaded from the truck and automatically positions the tree in the hole which has been prepared to receive it.

What we claim and desire to secure by Letters Patent is:

1. Tree moving apparatus including a vehicle, an elevated beam extending longitudinally on the vehicle, a pulley on the beam, a cable running on the pulley for hoisting the ball of a vertically positioned tree adapted to be moved by the apparatus, a second pulley on the beam, a third pulley, means for connecting the third pulley to the tree adjacent the ball thereof, and a flexible member running on said second and third pulleys and having opposite ends engageable respectively with said beam and the tree for tilting the tree.

2. In tree moving apparatus including a support, and tree hoisting means on the support including a hoisting cable engageable with the ball of a vertically positioned tree, a pulley on the support, a saddle engageable with the trunk of the tree adjacent the ball, a pulley having a hook engageable with the saddle, a flexible member running on said pulleys and having opposite ends engageable respectively with the support and the tree for balancing the hoisted tree.

3. Tree moving apparatus including a vehicle provided with an elevated track, a carriage movable on the track, a pulley on the carriage, a cable running on the pulley, means for engaging the cable with the lower end of a vertically positioned tree, means for operating the cable to hoist the tree and move the same in one direction on the vehicle, means for supporting the tree from the vehicle in horizontal position including means for leveling the tree during hoisting thereof, and a wheel on the track adjacent the outer end thereof to receive the cable for reversing the direction of movement of the tree by the cable.

4. Tree moving apparatus including a vehicle, an elevated beam extending longitudinally on the vehicle, a trolley on the beam, tree hoisting means associated with the trolley, a pulley on the beam, a pulley adapted to be connected with a tree, and a flexible member operable over said pulleys and having opposite ends fixed respectively to the tree and the beam for tilting the tree upon actuation of the hoisting means.

5. Tree moving apparatus including a vehicle, an elevated beam extending longitudinally on the vehicle, tree hoisting means associated with the beam, a pulley on the beam, a pulley adapted to be connected with a tree, and a flexible member operable over said pulleys and having opposite ends fixed respectively to the tree and the beam for tilting the tree upon actuation of the hoisting means.

6. In a tree moving apparatus including a support, tree hoisting means on the support including a hoisting cable engageable with the tree to be moved, a pulley on the support, a second pulley anchored to the trunk of the tree, a flexible member running over said pulleys and having opposite ends engageable respectively with the support and the trunk of the tree above said second named pulley for balancing the hoisted tree, and means engageable with the flexible member and one of the pulleys for controlling movement of the flexible member over said pulley.

7. A tree moving apparatus including a vehicle provided with an elevated track, a carriage movable on the track, a pulley on the carriage, a cable running over the pulley, a pulley block engaging the cable with the lower end of a vertically positioned tree, a pulley block supported at the end of the track, a second pulley connectable with the tree, a flexible member having one end anchored adjacent to said first named pulley block and running through said pulley blocks to have its other end connected to the tree for tilting the tree to a horizontal position incidental to lifting of the tree by the cable, means for operating the cable to lift the tree and move the same onto the vehicle with the top thereof supported by said flexible member, and a wheel supported by the track between said first named pulley block and the carriage for receiving a bight of the cable for reversing direction of movement of the tree to unload the tree from the vehicle.

8. A tree moving apparatus including a vehicle provided with an elevated track, a carriage movable on the track, a pulley on the carriage, a cable running on the pulley, a tackle block operably connected with the cable and engaging a tree substantially in its center of gravity when the tree is moved to substantially horizontal position, means on the vehicle for operating the cable to lift the tree and load it onto the vehicle, and a tackle mechanism operably connected with the tree and the elevated track arranged for tilting the tree to horizontal position including means for supporting the tree in such position when it is carried by the vehicle.

9. In a tree moving apparatus including a vehicle, an elevated support on the vehicle, a trolley movable on the support, a winch on the vehicle, a cable operably connected with the hoist and the trolley and adapted to be connected with a vertically positioned tree to lift the tree onto the vehicle, and a tackle mechanism connected with the elevated support and said tree automatically operable to move the tree to substantially horizontal position incidental to operation of said hoist to lift the tree for loading the tree onto the vehicle and to return the tree to vertical position when the hoist is reversed in lowering the tree from the vehicle.

10. In a tree moving apparatus including a vehicle, an elevated support on the vehicle, hoisting means on the vehicle and associated with said support arranged to load and unload a tree onto and off of the vehicle, and a tackle mechanism connected with the support and the tree operable automatically incidentally to operation of said hoisting means for moving the tree to horizontal position in loading and to move the tree to vertical position in the unloading operation of said hoist.

In testimony whereof we affix our signatures.

FRED BUEHLER.
JESS G. EAGLESON.